United States Patent [19]
Bright et al.

[11] Patent Number: 5,707,662
[45] Date of Patent: Jan. 13, 1998

[54] PARISON MOLDING AND COOLING APPARATUS

[75] Inventors: Stephen A. Bright, Troy; Anthony F. Newport, New Carlise, both of Ohio

[73] Assignee: Electra Form, Inc., Vandalia, Ohio

[21] Appl. No.: 551,378

[22] Filed: Nov. 1, 1995

[51] Int. Cl.$^6$ .................. B29C 45/40; B29C 45/72; B29C 49/64

[52] U.S. Cl. .................. 425/547; 425/533; 425/548; 425/556

[58] Field of Search .................. 425/547, 548, 425/556, 533, 526

[56] References Cited

U.S. PATENT DOCUMENTS

| | | | |
|---|---|---|---|
| 4,209,290 | 6/1980 | Rees et al. | 425/547 |
| 4,472,131 | 9/1984 | Ryder | 425/548 |
| 4,592,719 | 6/1986 | Bellehache et al. | 425/526 |
| 4,721,452 | 1/1988 | Delfer, III | 425/547 |
| 4,786,455 | 11/1988 | Krishnakumar et al. | 264/328.8 |
| 4,836,767 | 6/1989 | Schad et al. | 425/552 |
| 4,950,152 | 8/1990 | Brun, Jr. et al. | 425/533 |
| 5,051,227 | 9/1991 | Brun, Jr. et al. | 425/533 |
| 5,232,715 | 8/1993 | Fukai | 425/526 |
| 5,338,172 | 8/1994 | Williamson et al. | 425/547 |
| 5,443,360 | 8/1995 | Lamb et al. | 414/799 |
| 5,447,426 | 9/1995 | Gessner et al. | 425/526 |
| 5,569,476 | 10/1996 | Van Manen et al. | 425/556 |

FOREIGN PATENT DOCUMENTS

42 12 115 A1  6/1993  Germany ............... 425/526

*Primary Examiner*—Robert Davis
*Attorney, Agent, or Firm*—Locke Reynolds

[57] ABSTRACT

Apparatus for injection molding plastic articles includes a first mold base, a plurality of mold cavity units fixed to the first mold base, a second mold base, and a plurality of mold core units fixed to the second mold base in alignment with the mold cavity units fixed to the first mold base, the mold bases being reciprocally movable longitudinally with respect to each other, and a stripper plate, situated between the first and second mold bases and movable with respect to the second mold base, carrying a plurality of pairs of secondary mold elements, the secondary mold elements cooperating with the mold cavity-units and mold core units to define the surface of the plastic articles. Additional apparatus for cooling the molded plastic articles includes a support fixed to a surface of the first mold base confronting the second mold base, a plurality of article receiving tubes mounted for movement on the support between a first position aligned with the mold core units and a second position laterally spaced from the first position, a plurality of nozzles are fixed to the second mold base in alignment with the second position and are adapted to direct cooling fluid on plastic articles held by the receiving tubes when the first and second mold bases are positioned adjacent to each other.

27 Claims, 7 Drawing Sheets

PARISON MOLDING AND COOLING APPARATUS

BACKGROUND OF THE INVENTION

The present invention is directed generally to improvements in injection molding machines and particularly to the incorporation of cooling apparatus for extending the length of time during which a molded article can be cooled while maintaining a minimum length injection cycle time. The invention is particularly directed to the manufacture of parisons or preforms used in the manufacture of blow molded containers.

Conventional injection molding machines generally comprise a plastic material plasticating and injection unit which is coupled to a mold set consisting of two or more pieces which define a hollow of carefully defined shape and dimension intended to reflect the article sought to be formed by the injection molding process. The hollow is generally formed by a core unit and a cavity unit and is surrounded by channels containing a cooling fluid intended to absorb the heat from the plastics injected into the hollow until the plastic article becomes sufficiently stable in form to permit its removal from the mold set. As a general rule, the time required to inject the molten plastics is only a fraction of the time required for cooling the article once formed. This substantial cooling time represents a limiting factor for the rapidity with which the machine can be cycled during the manufacture of the articles in question.

The cycle time for conventional injection molding presses which mold parisons for use in the production of blow molded plastic containers, and allow for the parisons to cool sufficiently within the injection cavity to the point where they are form stable and no longer plastic or tacky, is typically between 20 and 30 seconds per cycle. This cycle time permits the parison to cool from approximately 300° C. down to less than 65° C. so the parisons may be ejected from the injection molding machine and handled by other devices without being deformed or damaged. During much of this cycle time, a volume of plastic for use in the subsequent cycle is being processed with heat and shearing action, and then held by the plasticating machine for injection into the injection mold once the first molded article is ejected. This heating and plastication of the plastic in order to permit injection can be achieved considerably faster than can the cooling of the plastic within the mold. As the plastic is worked by the plasticating machine and is held in that machine prior to injection molding, the plastic is subject to some amount of thermal degradation and aging which affects the chemistry and mechanical properties of the plastic. It is generally desirable for the plastic to be retained at elevated temperature for as brief a period of time as possible to minimize the chemical and mechanical changes to the polymer. It is also desirable to produce the molded articles as quickly as reasonably possible to maximize the utilization of the apparatus.

To better satisfy these criteria, it has been suggested to provide a mold assembly which includes cooling cavities as well as molding cavities and a means for transferring the molded article from the original molding cavity into a cooling cavity. Examples are to be found in U.S. Pat. Nos. 4,472,131; 4,950,152 and 5,051,227. In those patents, a portion of the mold set in which the molded article is formed is designed to move laterally with respect to the other elements of the mold set to transfer the freshly molded article from the mold cavity to a cooling cavity wherein the article can be cooled during the next subsequent cycle of article formation. While the disclosed apparatus generally achieves the intended purpose, the camming mechanism required to cause the various transfers to occur does present some control problems. Additionally, since a portion of the mold set in which the molded article is formed moves laterally out of alignment with respect to the other elements during the transfer, it is necessary to longitudinally realign the elements with the formation of each molded article which can contribute to lack of dimensional uniformity among the molded articles.

SUMMARY OF THE INVENTION

An apparatus of the present invention for cooling plastic articles is included in an injection molding machine wherein the injection molding machine includes a mold set having a first mold base and a second mold base. A plurality of mold cavity units are fixed to the first mold base while a plurality of mold core units are fixed to the second mold base in alignment with the mold cavity units. At least one of the two mold bases is reciprocally longitudinally movable between a closed position where the plastic articles can be molded and an open position to permit release of the molded articles from between the mold core units and mold cavity units. The cooling apparatus comprises a support fixed to a surface of the first mold base to confront the second mold base. A plurality of article receiving tubes are mounted for movement on the support between a first position aligned with the mold core units and a second position laterally spaced from the first position. A plurality of nozzles are fixed to the second mold base in alignment with the second position and are adapted to direct cooling fluid onto the plastic articles held by the receiving tubes when the first and second mold bases are positioned adjacent to each other in the closed position.

Preferably, the cooling apparatus includes at least one manifold unit including a plurality of channels. The manifold unit is coupled to the support for lateral movement between the first and second positions. A plurality of article receiving tubes are fixed to each manifold with each receiving tube being coupled to at least one of the plurality of channels in the manifold unit. At least one piston rod is fixed to either the support or the manifold unit. A piston is fixed on the distal end of each piston rod. A cylinder houses each piston. The cylinder is fixed to the other of the support and manifold units respectively. At least one fluid line couples the cylinder to a source of fluid pressure for moving the manifold with respect to the support.

In a preferred embodiment, the cooling apparatus includes an insert situated within each article receiving tube, the insert having an outer surface defining a fluid coolant path which is coupled to one of the manifold channels. The insert has an interior surface generally matching, but slightly larger than the molded article outer surface. An open end permits insertion of the molded article within the insert. The insert preferably has a thermal conductivity significantly greater than the article receiving tube to localize the cooling effects of the apparatus to the interior of the insert. Preferably the outside of the insert includes a plurality of fins for enhancing the cooling capacity of the insert.

Preferably, the cooling apparatus also includes an outer shoulder surrounding each of the plurality of nozzles, the outer shoulder being dimensioned to engage a surface of the molded article with sufficient force to permit removal of the article from the corresponding article receiving tube. The cooling apparatus also includes an ejector unit adjacent to each of the plurality of nozzles, the ejecting unit being movable with respect to the second mold base and positioned to eject the molded articles from engagement with the nozzle outer shoulders. The ejector unit is preferably coupled to a stripper plate situated between the first and second mold bases, the stripper plate carrying a plurality of pairs of secondary mold elements, the secondary mold elements cooperating define the portion of the plastic articles as they are being molded. The secondary mold elements also assist in the transfer of the molded articles from engagement on the mold core units to the article receiving tubes.

One feature of the present invention is the use of a plurality of article receiving tubes which are mounted for lateral movement between a first position aligned with the mold core units and a second position laterally spaced from the first position. This feature has the advantage of eliminating any requirement for lateral movement and recentering of any of the mold forming elements which could contribute to mold performance longevity.

Another feature of the present invention is the use of a common pneumatic source to control the lateral movements of the article receiving tubes between the first and second positions. This feature has the advantage of simplifying the control scheme required to operate the apparatus.

Additional features and advantages of the present invention will become apparent to those skilled in the art upon consideration of the following detailed description of a preferred embodiment exemplifying the best mode of carrying out the invention as presently perceived. The detailed description particularly refers to the accompanying figures.

DESCRIPTION OF THE PREFERRED EMBODIMENTS

Figure 1:
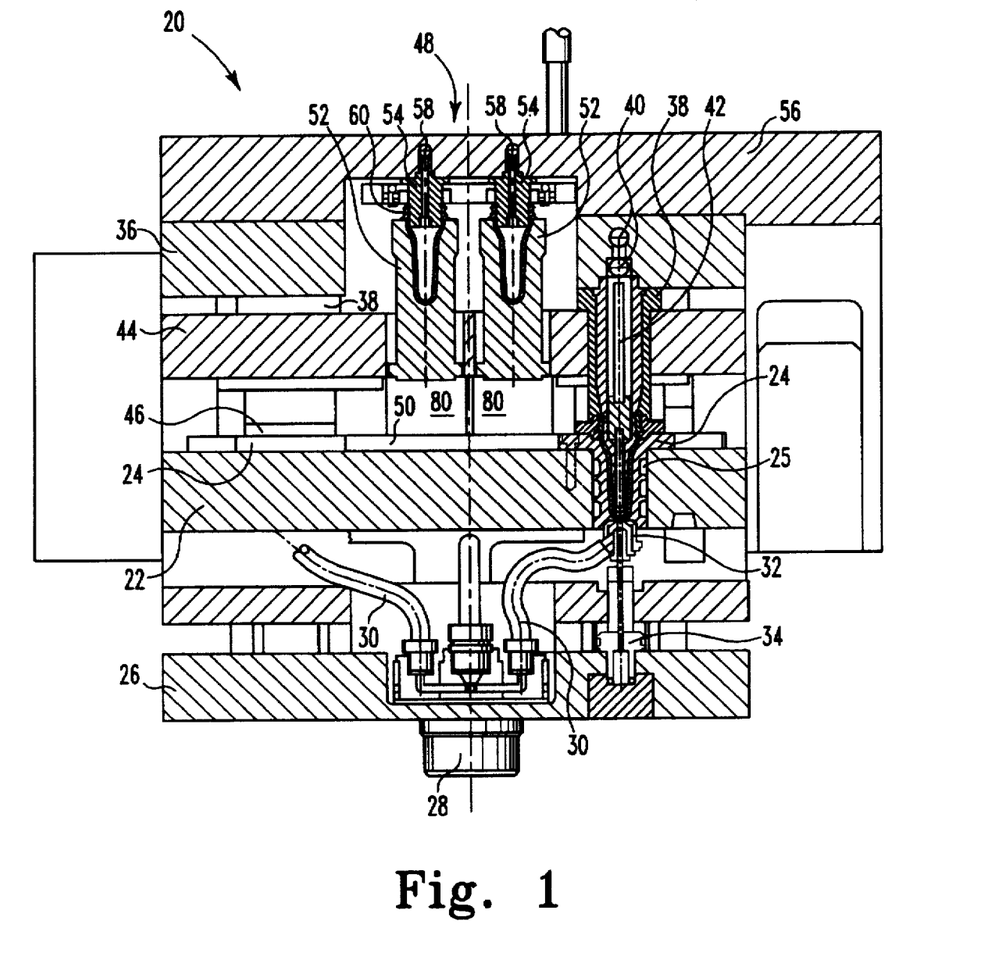
FIG. 1 is a sectional view of a parison molding and cooling apparatus in accordance with the present invention in a "closed" position to mold a set of parisons.
Figure 2:
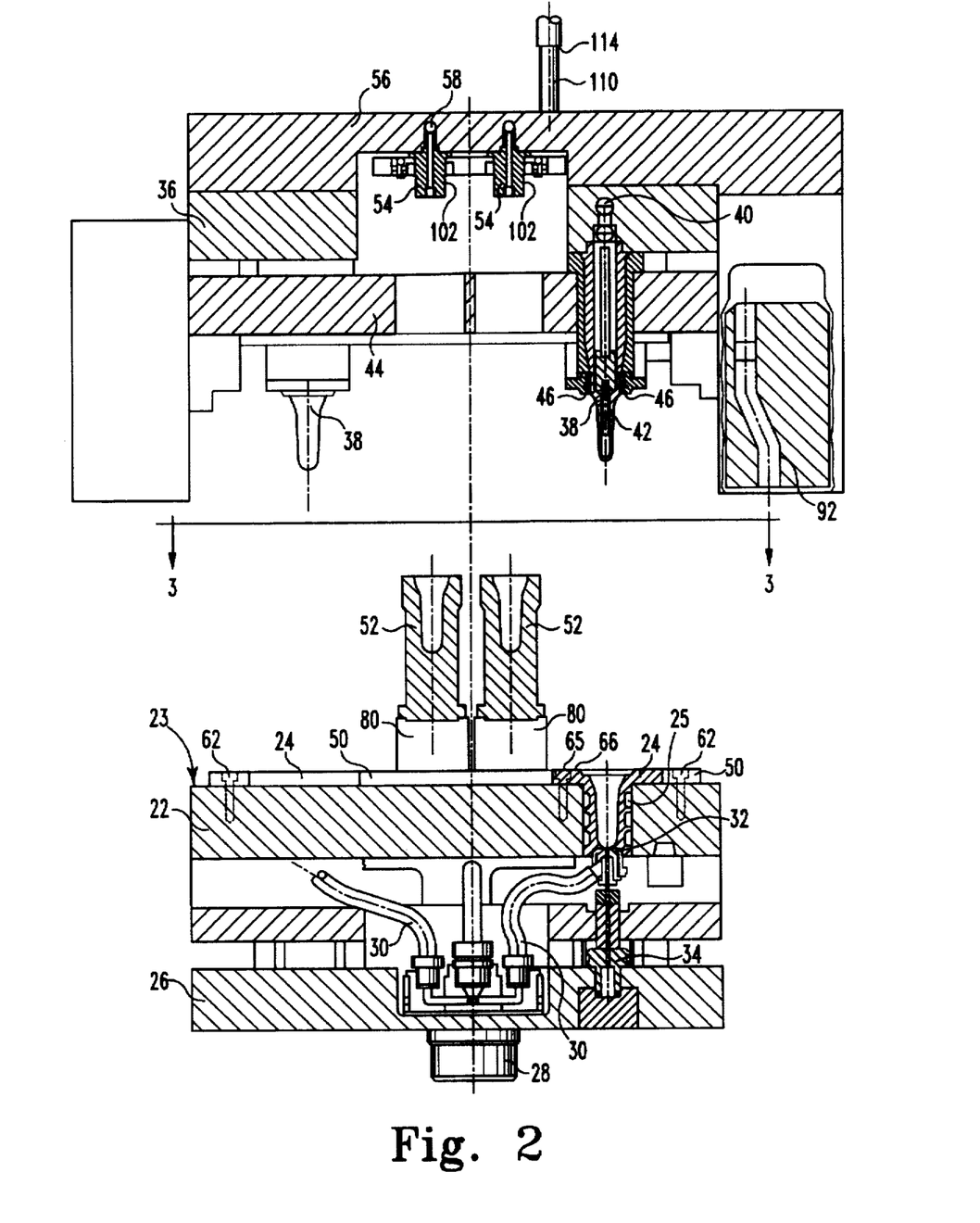
FIG. 2 is a sectional view similar to FIG. 1 but with the first and second mold base portions separated longitudinally from each other.

A mold set 20 incorporating the present invention is shown in FIG. 1 and FIG. 2 to include a stationary, first mold base 22. A plurality of mold cavity units 24 (one of which is shown in cross-section) are fixed to the first mold base 22 by fasteners 65 penetrating flanges 66. Each of the mold cavity units 24 is surrounded by a plurality of channels 25 through which is circulated a cooling fluid, such as water, in the conventional manner. A hot manifold unit 26 is fixed to the first mold base 22 and directs molten plastic from an injection unit input 28 through tubular members 30 to gates 32 which are controlled by gate valves 34. While a wide variety of hot manifold units might be employed in connection with the present invention to distribute the molten plastic from the injection unit input 28 to the gates 32, a preferred embodiment is disclosed in co-pending application Ser. No. 08/435,941 filed May 5, 1995, now U.S. Pat. No 5,536,164 which disclosure is hereby incorporated by reference.

The mold set 20 also includes a second mold base 36. A plurality of mold core units 38 are fixed to the second mold base 36, one of which is shown in cross-section. The second mold base 36 includes channels 40 which are coupled to a source of cooling fluid which is introduced in a conventional manner through a fountain unit 42 on the interior of the mold core units 38.

A stripper plate 44 is situated between the first mold base 22 and second mold base 36. The first and second mold bases are adapted to be periodically reciprocally moved longitudinally with respect to each other by motive means provided by an injection molding machine (not shown). Additionally, stripper plate 44 is adapted to be moved longitudinally with respect to the second mold base 36 in order to remove the molded article, identified hereafter as parison 60, formed between mold cavity unit 24 and mold core unit 38 from the core unit 38. This removal is assisted by secondary mold elements 46 often referred to as thread splits.

The mold set 20 additionally comprises cooling apparatus 48 for cooling the parisons after removal of the parisons from between the mold cavity units 24 and mold core units 38. The cooling apparatus 48 generally comprises a support 50 fixed to surface 23 of the first mold base 22 confronting the second mold base 36 by fasteners 62. A plurality of article receiving tubes 52 are mounted for movement on the support 50 through manifolds 80. A plurality of nozzles 54 are fixed to a cooling nozzle support plate 56 which is in turn fixed to the second mold base 36. The nozzles 54 are positioned to be in alignment with the article receiving tubes 52 when the first and second mold bases are positioned adjacent to each other in a "closed" position as shown in FIG. 1. In this position, the nozzles 54 are able to direct cooling fluid introduced through channels 58 in plate 56 to the interior of the parisons 60 held within the article receiving tubes 52. In a preferred embodiment, the cooling fluid is introduced through cooling channels 58 to the interior of the parisons 60 with sufficient pressure to insure intimate contact between the exterior surface of the parison 60 and the interior of the article receiving tube 52.

The cooling apparatus 48 is shown in greater detail in FIGS. 3–6 to include a support plate 50 which is mountable directly to surface 23 of the first mold base 22 by a plurality of fasteners 62. The support plate 50 includes apertures 64 adapted to receive flanges 66 of mold cavity units 24. A pair of tracks 68 are fixed to the front surface 51 of support plate 50 and are adapted to receive carriages fixed to the bottom of manifolds 80 which guide the manifolds laterally between the positions shown in FIGS. 3–4 on the one hand and the positions shown in FIGS. 5–6 on the other hand. A stem 70 is fixed to the center of support plate 50. A pair of piston rods 72 project laterally from the stem 70 and terminate with a piston 74 on the distal end of the piston rod 72. Each piston 74 is received within a cylinder 76 which is fixed to a manifold 80. A pair of lines 78 and 82 extend through support plate 50 and are adapted to be coupled to a source of pressurized fluid, such as compressed air, at couplings 84. The lines 78 and 82 extend upward through stem 70 and outward through piston rods 72. Line 78 terminates at opening 86 on the proximal side of piston 74 while line 82 continues through piston 74 to terminate on the distal side of the piston at opening 88. Pressurization of line 82 causes the cylinders 76 and manifolds 80 to move from the position shown in FIG. 4 to the position shown in FIG. 6. Alternatively, pressurization of line 78 causes cylinders 76 and manifolds 80 to move from the position shown in FIG. 6 back to the position shown in FIG. 4.

Figure 7:
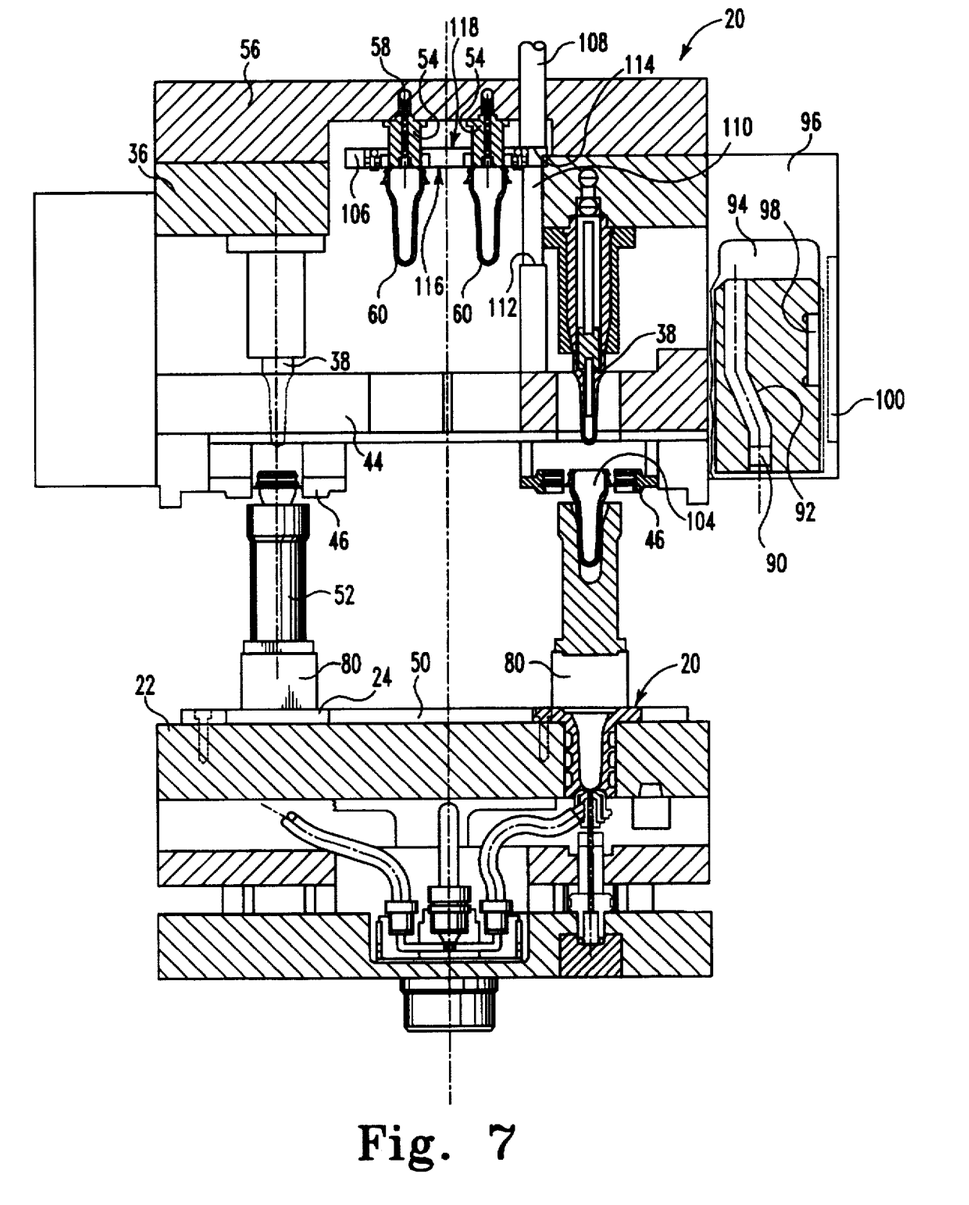
FIG. 7 is a sectional view of the parison molding and cooling apparatus shown in FIG. 1, but the article receiving tubes positioned to receive hot molded parisons from the thread splits, and with the cooled parisons being ejected from the cooling nozzles.

The operation of the stripper plate 44 and secondary mold elements 46 are more fully illustrated in FIG. 7 wherein the secondary mold elements 46, also known as thread splits, are shown to be coupled to a cam follower 90 which is slidably received in cam track 92. The cam track 92 comprises a channel defined within block 94. The block 94 is positioned within holder 96 at a position defined by toothed elements 98 and 100. While any of a number of cam and cam track arrangements could be used in connection with the present invention, the preferred structure for the adjustable cam track is disclosed in co-pending application Ser. No. 08/435,702 filed May 5, 1995, now U.S. Pat. No. 5,531,588 the disclosure of which is hereby incorporated by reference.

The cam follower 90 moves along cam track 92 as the stripper plate 44 moves from the position shown in FIGS. 1 and 2 to the position shown in FIG. 7. The motion of stripper plate 44 away from the second mold base 36 and toward first mold base 22 strips the molded parisons 60 from the mold core units 38 and deposits the molded parisons 60 in the article receiving tubes 52. This motion of the stripper plate also causes an outward displacement of the secondary mold elements 46 thereby releasing the molded parisons 60 into a cooperative engagement with the article receiving tubes 52.

Figure 3:
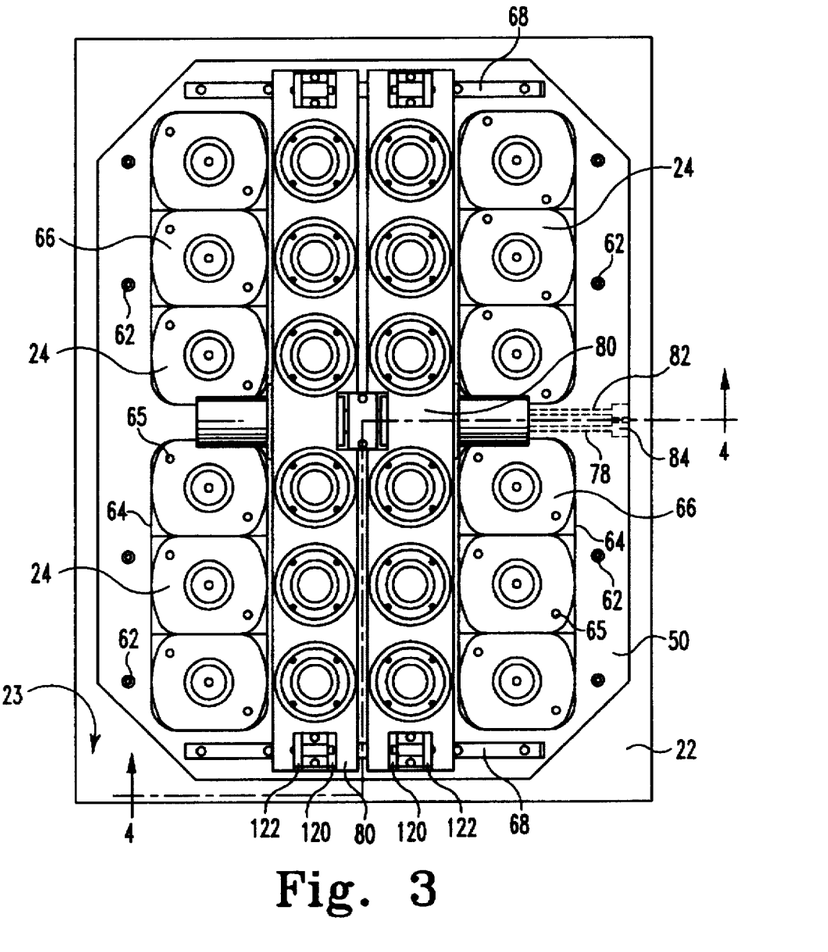
FIG. 3 is a plan view of the cooling apparatus and first mold base portion of the apparatus taken along line 3—3 of FIG. 2.
Figure 4:
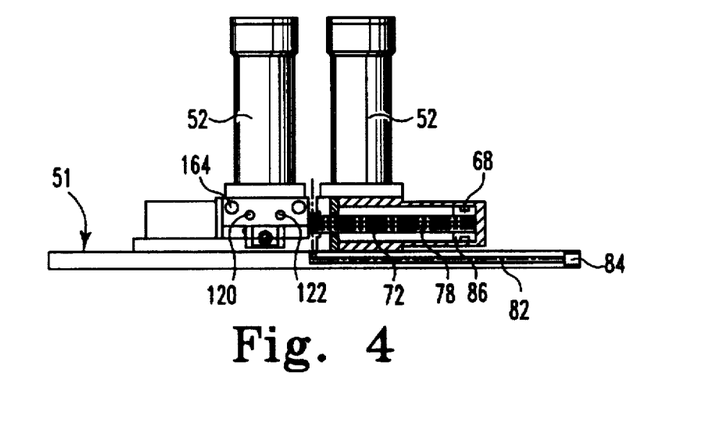
FIG. 4 is a partial sectional view of the cooling apparatus taken along line 4—4 or FIG. 3.
Figure 5:
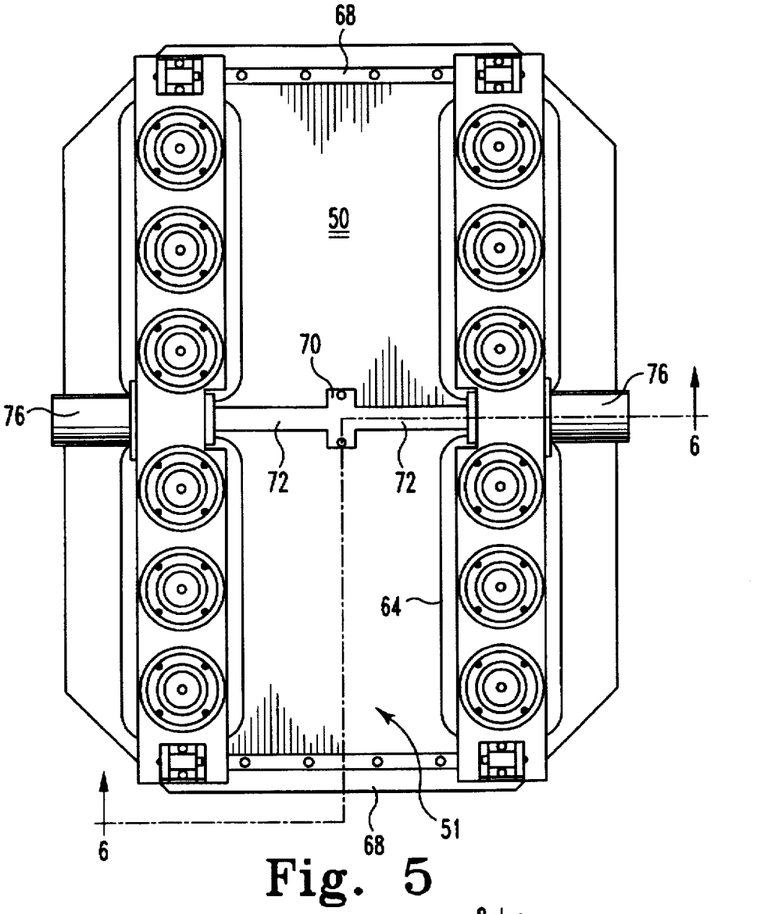
FIG. 5 is a plan view similar to FIG. 3, but with the article receiving tubes of the cooling apparatus separated laterally from each other.
Figure 6:
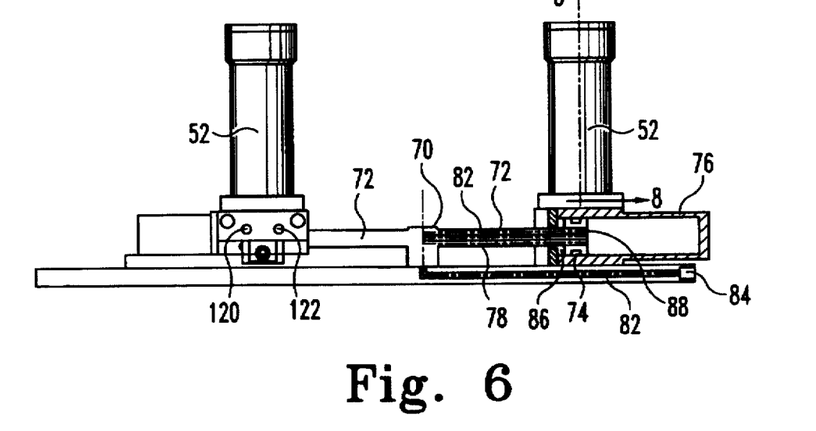
FIG. 6 is a sectional view similar to FIG. 4, but with the article receiving tubes of the cooling apparatus separated laterally from each other.

Once the molded parisons 60 are received in the article receiving tubes 52, the stripper plate 44 returns from the position shown in FIG. 7 to the position shown in FIG. 2 and the article receiving tubes 52 are translated from the positions shown in FIGS. 5–7 to the positions shown in FIGS. 2–4 through introduction of compressed air into line 82 as previously discussed. The mold set is then longitudinally moved from the open position shown in FIG. 2 to the closed position in FIG. 1 where molded parisons 60 held in article receiving tubes 52 are introduced into engagement with nozzles 54. The nozzle 54 each include an outer shoulder 102 which is dimensioned to engage the inner surface 104 of the mouth of the molded parison 60. Preferably the engagement is sufficiently tight to permit pressurization of the interior of the molded parison 60 by cooling fluid introduced through channel 58. The cooling fluid introduced through line 58 as well as the contact with the article receiving tube 52 is intended to remove heat from the molded parison 60 during the time in which a subsequent parison is molded between the mold cavity units 24 and mold core units 38.

When the hot molded parisons 60 are stripped from the mold core unit 38 through the action of the stripper plate 44, the cooled molded parisons 60 which are engaged on nozzles 54 are ejected by an ejector plate 106. The ejector plate 106 is coupled to the stripper plate 44 by rod 108 which includes a reduced diameter portion 110 defined by a back facing shoulder 112 and a forward facing shoulder 114. The reduced diameter portion 110 of rod 108 is dimensioned to slide freely through ejector plate 106. The shoulders 112 and 114 are dimensioned to abut the front and back surfaces 116 and 118, respectively, of ejector plate 106. The forward motion of the stripper plate 44 from the position shown in FIG. 2 to the position shown in FIG. 7 causes shoulder 114 to come into contact with back surface 118 of the ejector plate thereby moving the ejector plate 106 forward to eject the cooled molded parisons 60 from the nozzles 54. The return of the stripper plate 44 from the position shown in FIG. 7 to the position shown in FIG. 2 causes shoulder 112 of rod 108 to contact the front surface 116 of ejector plate 106 thereby returning the ejector plate from the position shown in FIG. 7 to the position shown in FIG. 2 thereby allowing the engagement between the shoulder 102 of nozzles 54 with the interior 104 of the hot molded parisons 60 held in article receiving tubes 52.

Figures 8, 9:
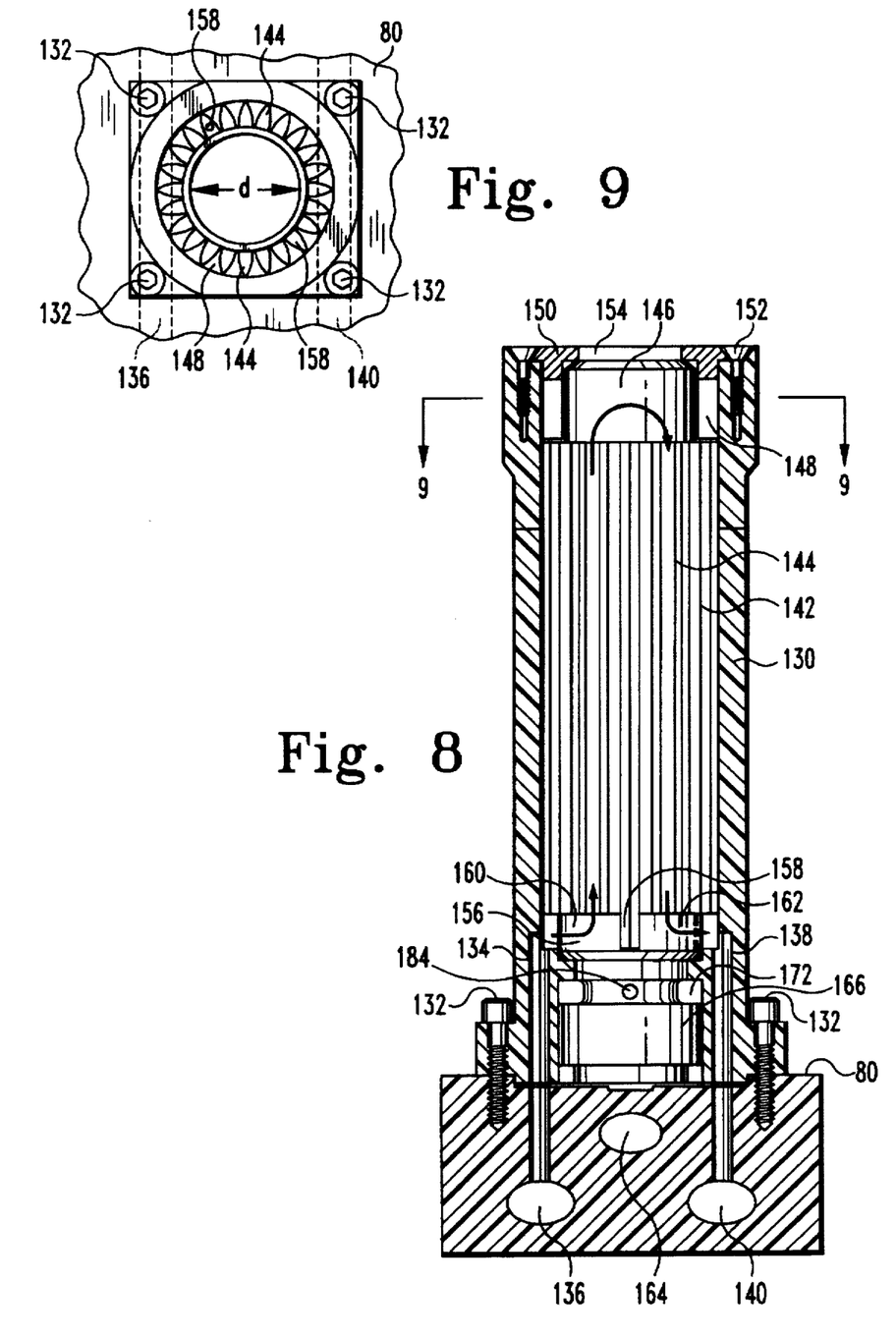
FIG. 8 is a partial sectional view taken along line 8—8 of FIG. 6.
FIG. 9 is a plan view of the article receiving tube shown in FIG. 8.
Figure 10:
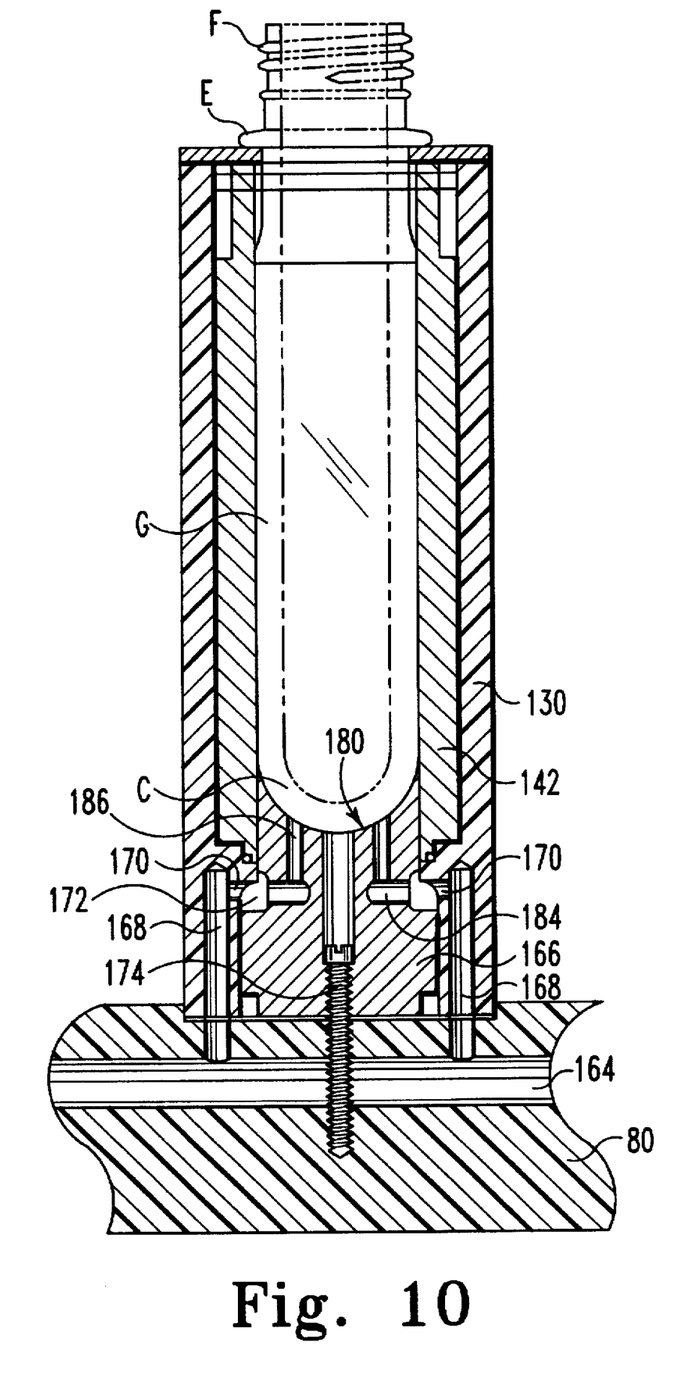
FIG. 10 is a section view of the article receiving tube taken at right angles to the view shown in FIG. 8 along line 10—10.

A preferred embodiment of the article receiving tubes 52 is shown in FIGS. 8–10 wherein each of the individual article receiving tubes 52 is shown to comprise a sleeve 130 fixed by bolts 132 to the manifold 80. The sleeve 130 is preferably made of an acetal copolymer engineering plastic such as ACETRON GP™ manufactured by Polymer Corporation, Reading, Pa., or an equivalent engineering grade plastic having a thermal conductivity of less than about $6\times10^{-4}$ cal. cm./sec. cm.$^{2\circ}$ C. The sleeve 130 includes a water inlet channel 134 coupled to a water supply channel 136 within manifold 80. The sleeve 130 also includes a water drain channel 138 coupled to water drain channel 140 within manifold 80. The channels 136 and 140 are coupled through couplings 120 and 122 shown in FIGS. 3 and 4 to a remote supply of chilled water which is introduced into channel 136 and withdrawn from channel 140. Within sleeve 130 is an insert 142 preferably made of 6061-T6 aluminum or other material having a high thermal conductivity. The insert 142 includes in a middle portion having a plurality of radiating fins 144. An upper end 146 of the insert is of reduced diameter to define an annular space 148 between the insert 142 and the sleeve 130. The annular space 148 is closed on the upper end by collar 150 secured by screws 152. The collar 150 has a central opening 154 dimensioned to slightly exceed the dimensions of the parison 60.

The lower end 156 of insert 142 is also of reduced diameter except in two locations diametrically opposite each other where a single fin 144 has an extended portion 158 which acts to separate a water entry space 160 from a water exit space 162 situated between the insert lower end 156 and the sleeve 130. The two extended portions 158 cause water entering through channel 134 to follow the path indicated by the arrows in FIG. 8 upward on the left side of the insert 142 and then to proceed downward on the right side of insert 142 and out through channel 140. The insert 142 preferably has an inner diameter d which is at least a few hundredths of a millimeter greater in diameter than the maximum diameter of the parison 60.

In addition to water channels 136 and 140, the manifold 80 also includes a vacuum channel 164 which is coupled to the source of vacuum and to the interior of insert 142 by way of a spool 166. The spool 166 is fixed within sleeve 130 by fastener 174 and has an upper end shown in FIG. 10 which extends into insert 142. The sleeve 130 includes a pair of vertical vacuum channels 168 and horizontal stub channels 170 which couple the vacuum to a small annular space 172 separating the lower portion of spool 166 from the interior surface of sleeve 130. The small annular space 172 couples the vacuum to horizontal channels 184 running from the outside edge the spool 166 to intersect with vertical channels 186 running vertically to a concave dished surface 180 at the top of the spool 166.

A small vacuum induced flow of air down the interior of the insert 142 through vertical channels 186 and horizontal channels 184 into space 172 is sufficient to aid in the capture of hot parisons 60 from the thread splits 46 when the molded parisons are stripped from mold cores 38. The parisons 60 handled by the preferred embodiment of this invention are generally of a test tube shape having a rounded bottom C and having a support flange E separating a lower body portion G from a finish portion F intended to engage a closure. The exact shape of the parison is subject to design variation well known in the art and is outside the scope of the present disclosure. The curvature of the dish-shaped upper surface of spool 166 conforms generally to the outer surface confirmation of the bottom end C of parison 60.

A vacuum hold on molded parison 60 is maintained until the parison is forcibly removed through frictional contact between the interior surface 104 of the finish portion F of the parison and shoulder 102 on nozzle 54 upon movement of the mold set away from the "closed" position. While the mold set is in the "closed" position, a cooling fluid is introduced through nozzle 54 preferably in sufficient pressure to expand the parison 60 into intimate contact with the inner surface of the insert 142. This intimate contact ensures accurate dimensional characteristics for the cooled parison 60 and enhances the heat transfer between the parison 60 and the insert 142.

Alternative cooling apparatus could be employed in the present invention in replacement for that shown in FIGS. 8–10. For example, the parison cooling apparatus of U.S. Pat. Nos. 4,592,719; 4,690,633; 5,114,327; 5,232,641; and 5,338,172 as well as co-pending U.S. patent application 08/359,037 could be employed with certain modifications. Additional variations and modifications exist within the scope and spirit of the invention as described and as defined in the following claims.

What is claimed is:

1. Apparatus for cooling plastic articles in an injection molding machine, the injection molding machine including a first mold base, a plurality of mold cavity units fixed to the first mold base, a second mold base, a plurality of mold core units fixed to the second mold base in alignment with the mold cavity units fixed to the first mold base, at least one of the mold bases being reciprocally movable toward and away from the other mold base, the cooling apparatus comprising: a support fixed to a surface of the first mold base confronting the second mold base, a plurality of article receiving tubes mounted for movement on the support between a first position aligned with the mold core units and a second position still confronting the second mold base but laterally spaced from the first position, a plurality of nozzles fixed to the second mold base in alignment with said second position and adapted to direct cooling fluid on plastic articles held by the receiving tubes when the first and second mold bases are positioned adjacent to each other.

2. The cooling apparatus of claim 1 further comprising at least one manifold unit including a plurality of channels, the manifold unit being coupled to the support for lateral movement between said first and second positions, a set of said plurality of article receiving tubes being fixed to each manifold, each receiving tube being coupled to at least one of the plurality of channels within the manifold unit.

3. The cooling apparatus of claim 2 further comprising at least one piston rod fixed to one of the support and manifold units, a piston fixed on a distal end of each piston rod, and a cylinder housing each piston, each cylinder being fixed to one of the manifold units and support, respectively, at least one fluid line coupling the cylinder to a source of fluid pressure for moving the manifold units with respect to the support.

4. The cooling apparatus of claim 2 further comprising an insert situated within each article receiving tube, the insert having an outer surface defining within the article receiving tube a fluid coolant path coupled to a first of the plurality of manifold channels, the insert having an interior surface matching, but slightly larger than, the molded article outer surface, and an open end permitting insertion of the molded article within the insert.

5. The cooling apparatus of claim 4 further comprising a spool situated within an end of each article receiving tube having a channel coupled to a second of the plurality of manifold channels, the second channel being coupled to a source of vacuum to assist in maintaining an intimate contact between said insert interior surface and said molded article.

6. The cooling apparatus of claim 4 wherein the insert has a thermal conductivity significantly greater than the article receiving tube to localize the cooling effects of the apparatus to the interior of the insert.

7. The cooling apparatus of claim 4 wherein the insert outer surface comprises a plurality of fins for enhancing the cooling capacity of the insert.

8. Apparatus for cooling plastic articles in an injection molding machine, the injection molding machine including a first mold base, a plurality of mold cavity units fixed to the first mold base, a second mold base, a plurality of mold core units fixed to the second mold base in alignment with the mold cavity units fixed to the first mold base, at least one of the mold bases being reciprocally movable toward and away from the other mold base, the cooling apparatus comprising: a support fixed to the first mold base, a plurality of article receiving tubes mounted for movement on the support between a first position aligned with the mold core units and a second position laterally spaced from the first position, an insert situated within each article receiving tube, the insert having an outer surface comprising a plurality of fins for enhancing the cooling capacity of the insert and defining within the article receiving tube a fluid coolant path coupled to a first of a plurality of manifold channels, at least one of the fins being elongated for the purpose of separating an in-flowing stream of fluid coolant from and out-flowing stream of fluid coolant.

9. The cooling apparatus of claim 4 wherein the spool is situated adjacent the manifold and includes a surface for contact by an end of the molded article and at least one pathway coupling the second manifold channel to the molded article end contacting surface.

10. The cooling apparatus of claim 4 further comprising an end cap fixed to the article receiving tube and retaining the insert within the article receiving tube, the end cap including an opening having a shape similar to the insert open end permitting insertion of the molded article within the insert, the end cap having an interior surface defining a portion of said fluid coolant path.

11. Apparatus for cooling plastic articles in an injection molding machine, the injection molding machine including a first mold base, a plurality of mold cavity units fixed to the first mold base, a second mold base, a plurality of mold core units fixed to the second mold base in alignment with the mold cavity units fixed to the first mold base, at least one of the mold bases being reciprocally movable toward and away from the other mold base, the cooling apparatus comprising: a support fixed to the first mold base, a plurality of article receiving tubes mounted for movement on the support between a first position aligned with the mold core units and a second position laterally spaced from the first position, a plurality of nozzles fixed to the second mold base in alignment with said second position and adapted to direct cooling fluid on plastic articles held by the receiving tubes when the first and second mold bases are positioned adjacent to each other, an outer shoulder surrounding each of said plurality of nozzles, the outer shoulder being dimensioned to engage a surface of the molded article with sufficient force to permit removal of the article from the corresponding article receiving tube.

12. The cooling apparatus of claim 11 further comprising an ejector adjacent each of the plurality of nozzles, movable with respect to the second mold base, and positioned to eject the molded article from engagement with the nozzle outer shoulders.

13. The cooling apparatus of claim 12 further comprising a stripper plate situated between the first and second mold bases and movable with respect to the second mold base, a plurality of pairs of secondary mold elements coupled to the stripper plate for movement therewith, the secondary mold elements cooperating with the mold cavity units and mold core units to define a portion of said plastic articles.

14. The cooling apparatus of claim 13 further comprising at least one cam situated at a selected position adjacent the second mold base, at least one cam follower coupled to at least some of the secondary mold elements and engaged in the at least one cam for assisting in the transfer of molded articles from engagement on the mold core units to the article receiving tubes.

15. The cooling apparatus of claim 13 further comprising at least one rod coupling the stripper plate and the ejector for coordinating the movement of the stripper plate and ejector relative to the second mold base.

16. Apparatus for cooling molded plastic articles comprising: a support adapted to be fixed to a surface of a first mold and to confront a second mold in an injection molding machine, a manifold unit including a plurality of channels, the manifold unit being coupled to the support for lateral movement between a first position and a second position, both the first and second positions confronting the second mold, a set of article receiving tubes fixed to the manifold to project toward the second mold, each receiving tube being coupled to at least one of the plurality of channels within the manifold unit, the manifold channels being adapted to be coupled to a supply of cooling fluid.

17. The cooling apparatus of claim 16 further comprising a piston rod fixed to the support, a piston fixed on a distal end of the piston rod, and a cylinder housing the piston, the cylinder being fixed to the manifold, a fluid line coupling the cylinder to a source of fluid pressure for moving the piston within the cylinder thus moving the manifold with respect to the support between said first and second positions.

18. The cooling apparatus of claim 16 further comprising an insert situated within each article receiving tube, the insert having an outer surface defining within the article receiving tube a fluid coolant path coupled to a first of the plurality of manifold channels, the insert has a thermal conductivity significantly greater than the article receiving tube to localize the cooling effects of the apparatus to the interior of the insert, the insert having an interior surface matching, but slightly larger than, said molded plastic article outer surface, and an open end permitting insertion of the molded article within the insert.

19. The cooling apparatus of claim 18 further comprising a spool situated within each article receiving tube adjacent the manifold, the spool including a surface for contact by an end of the molded article and at least one pathway coupling the second manifold channel to the molded article end contacting surface.

20. The cooling apparatus of claim 18 wherein the insert outer surface comprises a plurality of fins for enhancing the cooling capacity of the insert, at least one of the fins being elongated for separating an inflowing stream of fluid coolant from and out-flowing stream of fluid coolant, the cooling apparatus further comprising an end cap fixed to the article receiving tube and retaining the insert within the article receiving tube, the end cap including an opening having a shape similar to the insert open end permitting insertion of the molded article within the insert, the end cap having an interior surface defining a portion of said fluid coolant path.

21. Apparatus for injection molding and cooling plastic articles, the apparatus comprising: a mold base, a plurality of mold core units fixed to the mold base at a first position, the mold core units defining a portion of said plastic articles, a plurality of nozzles fixed to the mold base at a second position spaced laterally and longitudinally with respect to the first position, the plurality of nozzles being adapted to direct cooling fluid on said plastic articles at said second position, both the first and second positions being within the lateral confines of the mold base.

22. The apparatus of claim 21 further comprising a stripper plate mounted for movement with respect to the mold base, a plurality of pairs of secondary mold elements coupled to the stripper plate for movement therewith, the secondary mold elements defining a portion of said plastic articles.

23. The cooling apparatus of claim 22 further comprising an outer shoulder surrounding each of said plurality of nozzles, the outer shoulder being dimensioned to engage a surface of the molded article.

24. The cooling apparatus of claim 23 further comprising an ejector adjacent each of the plurality of nozzles, movable with respect to the mold base, and positioned to eject the molded article from engagement with the nozzle outer shoulders.

25. The cooling apparatus of claim 24 further comprising at least one rod coupling said stripper plate and the ejector for coordinating the movement of the stripper plate and ejector relative to the mold base.

26. The cooling apparatus of claim 8 wherein said support is fixed to a surface of the first mold base confronting the second mold base and wherein said first and second positions for the article receiving tubes are both within the lateral confines of the first mold base.

27. The cooling apparatus of claim 11 wherein said support is fixed to a surface of the first mold base confronting the second mold base and wherein said first and second positions for the article receiving tubes are both within the lateral confines of the first mold base.

* * * * *